US012780535B2

(12) United States Patent
Garrett

(10) Patent No.: US 12,780,535 B2
(45) Date of Patent: Nov. 3, 2026

(54) CORE CATCHER APPARATUS AND METHOD

(71) Applicant: Ronald Gregory Garrett, Dickinson, TX (US)

(72) Inventor: Ronald Gregory Garrett, Dickinson, TX (US)

( * ) Notice: Subject to any disclaimer, the term of this patent is extended or adjusted under 35 U.S.C. 154(b) by 112 days.

(21) Appl. No.: 19/055,039

(22) Filed: Feb. 17, 2025

(65) Prior Publication Data

US 2025/0313404 A1 Oct. 9, 2025

Related U.S. Application Data

(60) Provisional application No. 63/564,481, filed on Mar. 12, 2024.

(51) Int. Cl.

| | |
|---|---|
| ***F16M 11/24*** | (2006.01) |
| ***B65F 1/14*** | (2006.01) |
| ***F16M 11/18*** | (2006.01) |
| ***F16M 11/26*** | (2006.01) |

(52) U.S. Cl.

CPC ............ *B65F 1/141* (2013.01); *F16M 11/18* (2013.01); *F16M 11/242* (2013.01); *F16M 11/26* (2013.01); *B65F 2240/137* (2013.01)

(58) Field of Classification Search

CPC ...... F16M 11/18; F16M 11/242; F16M 11/26; B23B 51/044; B23B 51/04; B23B 51/0466

See application file for complete search history.

(56) References Cited

U.S. PATENT DOCUMENTS

| | | | | | |
|---|---|---|---|---|---|
| 4,245,666 | A * | 1/1981 | Norris | E04G 21/30 | 248/94 |
| 6,206,616 | B1 * | 3/2001 | Smith | B23B 51/044 | 408/208 |
| 6,266,939 | B1 * | 7/2001 | Yates | E04F 21/00 | 52/749.1 |
| 7,621,352 | B2 * | 11/2009 | Izatt | B23B 51/044 | 175/403 |
| 8,647,030 | B2 * | 2/2014 | Duncan | B28D 1/041 | 408/72 R |
| 8,657,037 | B2 * | 2/2014 | Noiman | B23B 51/044 | 175/239 |
| 9,671,059 | B1 * | 6/2017 | Gabaldon | A47G 23/04 | |
| 11,623,285 | B2 * | 4/2023 | Dewberry | B23B 51/044 | 408/1 R |
| 2005/0051682 | A1 * | 3/2005 | Tuohy | F16M 11/245 | 248/176.1 |
| 2010/0288908 | A1 * | 11/2010 | McGraw | A63B 47/002 | 248/688 |

(Continued)

*Primary Examiner* — Shane Bomar

(74) *Attorney, Agent, or Firm* — Daniel N. Lundeen; Lundeen & Lundeen PLLC

(57) ABSTRACT

Core catcher (100) with a retractably extensible support column (110) between a lower landing foot (112) and an upper debris receptacle (104). Lower leg brackets (130) are radially positioned about the support column spaced above the landing foot. Respective legs (106) pivotally connected to the leg brackets with free ends (160) independently pivotable between a retracted position (102) with the free ends adjacent the support column and an extended position (118) with the free ends spaced away from the support column to engage a stabilizing surface (B1). Method of catching a core drilled from an elevated deck using the core catcher is also disclosed.

20 Claims, 11 Drawing Sheets

(56) References Cited

U.S. PATENT DOCUMENTS

| | | | | |
|---|---|---|---|---|
| 2014/0334891 | A1 * | 11/2014 | Sandler | B23B 41/00<br>408/72 R |
| 2022/0143716 | A1 * | 5/2022 | Il'In | B23B 49/02 |

* cited by examiner

CORE CATCHER APPARATUS AND METHOD

BACKGROUND

This disclosure is directed to an apparatus and method for catching a core drilled through an elevated concrete deck and associated debris and drilling fluid. Passages through such an elevated concrete deck are frequently needed for pipes, electrical wire, and other items. These are typically drilled from above and debris, fluid used in the coring process, and the core, can fall onto the surface below the concrete deck, which can damage the deck below or other items below the coring operation or injure nearby personnel.

Prior art core catching technology is disclosed in U.S. Pat. No. 6,266,939 (Yates); U.S. Pat. No. 4,245,666 (Norris); US20050051682 (Tuohy); U.S. Pat. No. 9,671,059 (T); US20100288908 (McGraw). These references generally disclose telescopically mounted receivers with either a simple base or legs that make positioning, vertically stabilizing, and/or removal of the apparatus after catching the core problematic. Moreover, these devices do not have any means to facilitate raising or lowering the receiver. U.S. Pat. No. 7,621,352 (Izatti) discloses a core catcher element that is suspended from a catcher rod attached to the core drill above the deck being cored.

What is needed is a core catcher that facilitates transportation, deployment into position, vertical stabilization, elevation and lowering of the receiver, and/or removal of debris, independently of the core drill.

SUMMARY

I have discovered a core catcher apparatus and method using both a landing foot and independently retractable/extendable legs in one embodiment to facilitate transportation, deployment into position, vertical stabilization, and/or removal of debris. In another embodiment, a lift assembly facilitates elevation and lowering of the debris receptacle.

In one aspect of the invention, embodiments herein provide an apparatus having a support column, with a landing foot at a lower end and a receptacle mounted at an upper end. The support column is extensible to raise and lower the receptacle. A plurality of leg brackets are radially arrayed about a lower end of the support column above the landing foot. Stabilizing legs are pivotally attached at pivot points on the leg brackets. The legs are retractable and extendable to engage a bearing surface spaced away from the landing foot. Keepers are provided to selectively hold the legs in the extended position and to retain the legs in the retracted position.

In use, the location of the core drilling in an upper deck elevated above a lower bearing surface is first determined and with the legs retracted and the column lowered, the landing foot of the apparatus can be positioned to rest on the lower bearing surface at the core drilling location. One or more of the stabilizing legs are then released, extended for their free ends to engage the floor or a wall, and locked in position to stabilize the column in vertical alignment. Where the location is against a wall, two of the legs parallel to the wall and the leg opposite the wall are extended, and the leg adjacent the wall can be partially extended to engage the wall since the wall can stabilize the apparatus on that side. Where the location is in a corner where two walls meet at 90 degrees, two adjacent legs can be extended parallel to respective walls and the other two legs remain retracted or partially extended against the walls, which facilitates stabilization on those respective sides.

The column is extended upwardly until the receptacle engages the lower surface of the upper deck. The core is then drilled, with the debris, drilling fluid, and core being caught in the receptacle. When the coring operation is complete, the receptacle and column are lowered and one or more of the stabilizing legs with free ends engaging the floor are retracted and secured. Pivoting at the foot, the column and receptacle can be tipped in the direction of a retracted leg to facilitate removal of the core, debris, fluid, etc. in a non-elevated position.

In another aspect of the invention, embodiments herein provide an apparatus comprising: a support column having a landing foot at a lower end and a receptacle mounted at an upper end, the support column comprising an internal lift member slidably received in an outer tubular member; a crank assembly to selectively extend the support column to raise the receptacle and retract the support column to lower the receptacle, the crank assembly comprising a winch, a ratchet and a pawl to hold the support column in the extended position wherein the pawl can be disengaged to allow retraction of the support column, and a cable connected between the winch and the internal lift member; a mounting on the outer tubular member intermediate the landing foot and an upper end of the outer tubular member to attach the crank assembly; a longitudinal slot formed in the outer tubular member; a cable connector plate on the internal lift member projecting radially outwardly into the longitudinal slot and connected to the cable; and a pulley support positioned adjacent the longitudinal slot on the outer tubular member above the crank assembly, the cable passing from the winch over a pulley mounted in the pulley support to the cable connector, wherein winding the cable up in the winch raises the internal lift member with respect to the outer tubular member to raise the receptacle, and playing the cable out of the winch lowers the internal lift member with respect to the outer tubular member to lower the receptacle.

DETAILED DESCRIPTION

Figure 1:
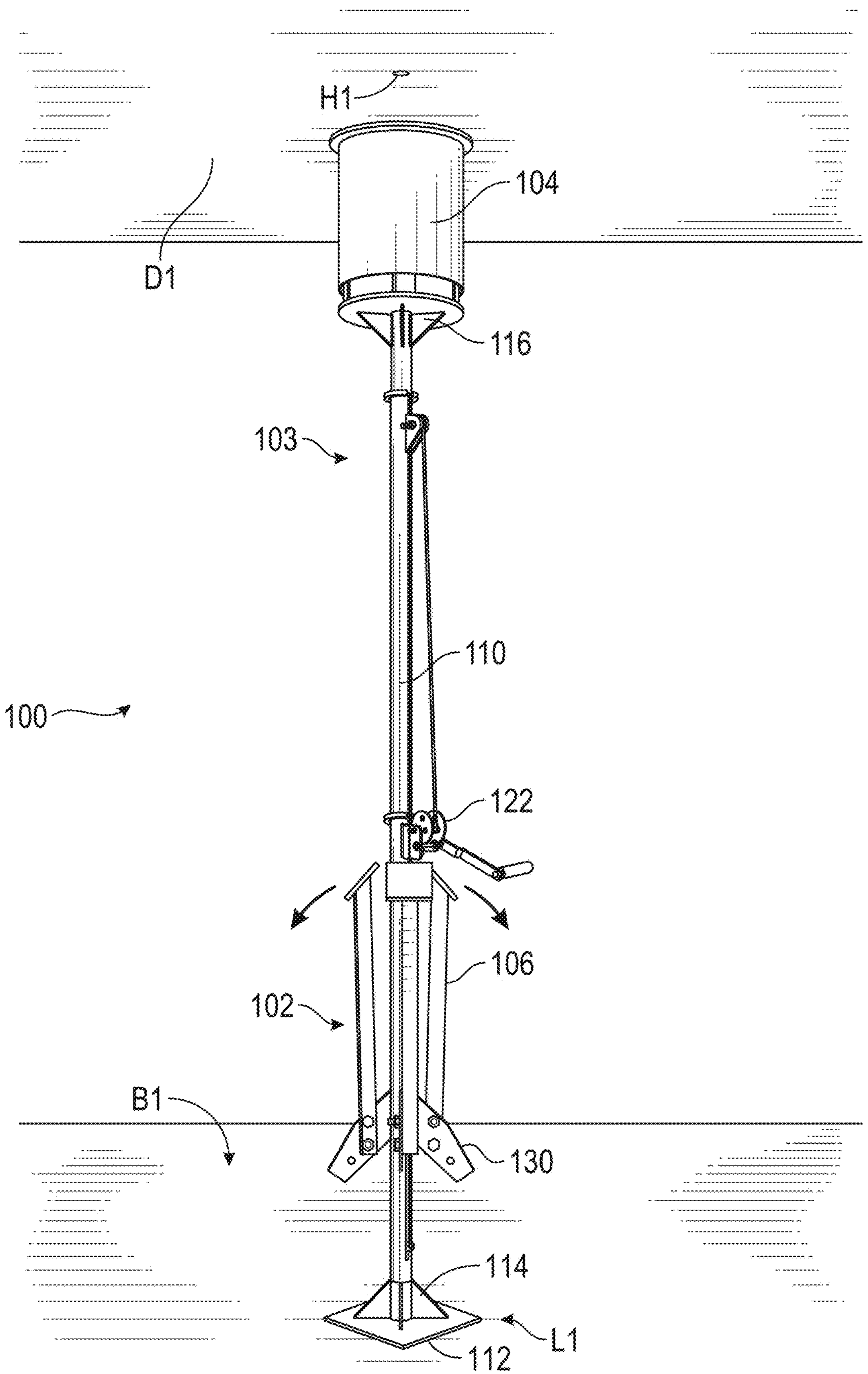
FIG. 1 shows a side elevation of a core catcher apparatus in a transport or deployment configuration (102, 103) positioned for deployment according to an embodiment of the invention.

Throughout the entire specification, including the claims, the words and phrases used herein shall have meanings consistent with the words and phrases used by those skilled in the relevant art. The following definitions of specific terms used in this disclosure is intended to clarify the meanings of the terms in a manner consistent with their ordinary meaning. No special definition of a term or phrase different from the ordinary and customary meaning as understood by those skilled in the art is intended to be implied except where expressly set forth.

The term "aluminum" refers to commercial grade aluminum or higher.

The terms "and/or" and "and or" refer to both the inclusive "and" case and the exclusive "or" case, and such term is used herein for brevity. For example, a composition comprising "A and/or B" may comprise A alone, B alone, or both A and B.

The term "assembly" refers to a group of items gathered together in one place for at least one common purpose.

He term "cable" refers to a length of line that may be stranded or not.

The term "comprising" refers to making up or constituting. The term "comprising" is open-ended and does not generally exclude the presence of unspecified components, features or limitations.

The term "consisting of" refers to making up or constituting, however, the term is closed in that it generally excludes the presence of additional components or features.

The term "gusset" refers to a bracket or angular piece of metal fixed at the angles of a structure to give strength or firmness.

The term "in" refers to a first material or component that is within, on, or adjacent to a second material or component.

The term "intermediate" refers to midway or somewhere between.

The term "keeper" refers to a stationary fitting that catches or holds a moving part such as a latch or bolt.

As used herein, the terms "less than" or "up to" a specific amount of a component, without specification of a lower limit, include zero, i.e., the component is optional.

The term "method" refers to a particular form of procedure for accomplishing or approaching something.

The term "pawl" refers to a pivoted catch engaging by an edge or hook with a ratchet wheel or a rack to prevent reverse motion.

The term "pivotally connected" refers to attached (attaching) and capable of rotating or turning about the point of direct or indirect attachment.

The term "plate" refers to a broad, flat piece of material.

The term "pulley" refers to a rotating element which a cord, cable or spring at least partially passes around.

The term "resilient" encompasses the capability of returning to an original shape or position, as after having been compressed.

The term "selectively" refers to a way that involves the selection of only particular things.

The term "slidably receiving" refers to a physical relationship between bodies, such that one body is capable of sliding relative to another.

The term "slot" refers to an opening whose length is substantially greater than its width.

The term "system" refers to a set of things working together as parts of a mechanism or an interconnecting network.

The term "upright" refers to oriented generally vertically but allowing for slight inclination.

According to embodiments herein, a core catcher apparatus (100) comprises a support column (110) that is retractably extensible between a landing foot (112) at a lower end (114) and a receptacle (104) mounted at an upper end (116). A plurality of leg brackets (130) are radially positioned about the support column near the lower end and spaced above the landing foot. A like plurality of respective legs (106) have connected ends (144) pivotally connected to the leg brackets and free ends (160) independently pivotable between a retracted position (102) with the free ends adjacent the support column and an extended position (118) with the free ends spaced away from the support column to engage a stabilizing surface (B1, B2). The core catcher in any embodiment may conveniently be provided with an internal lift member (132) supporting the receptacle at the upper end and slidably received in an outer tubular member (126) connected to the landing foot at the lower end. A lift assembly (122) is provided to selectively raise and lower the internal lift member with respect to the outer tubular member to lengthen the support column to raise the receptacle and to shorten the support column to lower the receptacle.

Preferably, the lift assembly comprises a winch (170) to wind up or play out a cable (138) connected to the internal lift member; a mounting (172) on the outer tubular member to attach the winch; a ratchet (182); and a ratchet lock pawl (188) for engagement to hold the support column in a lengthened configuration and for disengagement for the shortening of the support column.

Preferably, the lift assembly comprises a winch (170) to wind up or play out a cable (138) connected to the internal lift member; a mounting (172) on the outer tubular member to attach the winch; a ratchet (182); and a ratchet lock pawl (188) for engagement to hold the support column in a lengthened configuration and for disengagement for the shortening of the support column. In any embodiment, the core catcher apparatus further comprises a longitudinal slot (136) formed in the outer tubular member; a cable connector plate (134) on the internal lift member projecting radially outwardly into the longitudinal slot and connected to the cable; and a pulley (190) mounted in a pulley support (192) positioned on the outer tubular member above the lift assembly. Conveniently, the cable can pass from the winch over the pulley to the cable connector such that winding the cable up in the winch raises the internal lift member with respect to the outer tubular member, and playing the cable out of the winch lowers the internal lift member with respect to the outer tubular member.

The receptacle, e.g., in the shape of a bucket, preferably comprises a resilient member (208) at an upper peripheral flange (206) to sealingly engage a deck lower surface (D1).

The landing foot preferably comprises a transverse plate (124) extending laterally from the support column to engage a horizontal bearing surface (B1).

The core catcher preferably comprises respective first keepers (154) for the plurality of stabilizing legs to cooperate with a leg stabilizing bolt and hold the stabilizing legs in the extended position with the free ends engaging the horizontal bearing surface. Preferably, the core catcher further comprises respective second keepers for the plurality of stabilizing legs to cooperate with a leg retention bolt and hold the stabilizing legs in the retracted position with the free ends adjacent the support column. If desired, the core catcher may also comprise one or more intermediate keepers for the plurality of stabilizing legs to cooperate with an intermediate leg stabilizing bolt and hold the stabilizing legs in the extended position with the free ends engaging an upright bearing surface rising from the horizontal bearing surface. If desired, a radius arc keeper can be provided as an alternative to one or more of the first, second, and intermediate keepers.

In any embodiment, the core catcher can further comprise one or more of: aluminum materials of construction for the support column, the leg brackets, and the stabilizing legs to reduce a weight of the apparatus; an internal lift member of the support column attached to the receptacle and an outer tubular member of the support column attached to the landing foot; a manual crank assembly to selectively extend the support column to raise the receptacle and retract the support column to lower the receptacle; an outwardly extending flange at an upper end of the receptacle to receive a resilient member to sealingly engage a deck lower surface; a transverse plate attached to the upper end of the support column with gussets and clips to removably secure the receptacle to the transverse plate; a longitudinal slot formed in an outer tubular member of the support column, one or more transverse stiffener plates secured to the outer tubular member along the longitudinal slot, a pair of pulley supports positioned on the outer tubular member on either side of the longitudinal slot and securing a pulley with a pulley bolt passing through respective bores in the pulley supports, and a mounting to attach a crank assembly wherein the mounting spans the longitudinal slot and is attached to the outer tubular member on either side of the longitudinal slot.

In another aspect of the invention, a method of catching a core drilled from an elevated deck, comprises: determining a core drilling location (H1) in an upper deck (D) elevated above a lower bearing surface (B1); determining a core catching location (L1) on the lower bearing surface beneath the core drilling location; positioning on the lower bearing surface at the core catching location a landing foot (112) of a core catching apparatus (100) that is connected to a lower end (114) of a support column (110) connected to a receptacle (104) mounted at an upper end (116) of the support column; independently pivoting a plurality of stabilizing legs (106), having connected ends (144) pivotally connected to a like plurality of leg brackets (130) radially positioned about the support column near the lower end and spaced above the landing foot, to engage respective free ends of the legs with one or more stabilizing surfaces (B1, B2) in an extended position (118) to stabilize the core catching apparatus; extending a length of the support column to raise the receptacle to engage an underneath surface (D1) of the upper deck about the core drilling location; with the receptacle in engagement with the underneath surface, coring the upper deck at the core drilling location and catching a core (C) in the receptacle; retracting the length of the support column to lower the receptacle; removing the core from the lowered receptacle; and independently pivoting the plurality of legs to position the respective free ends adjacent the support column.

The method preferably comprises: operating a lift assembly (122) to selectively raise and lower an internal lift member (132) of the support column with respect to an outer tubular member (126) slidably receiving the internal lift member to lengthen the support column to raise the receptacle and to shorten the support column to lower the receptacle. Operation of the lift assembly preferably comprises winding up in, or playing out from, a winch (170), a cable (138) connected to the internal lift member, wherein the winch is attached on a mounting (172) to the outer tubular member; engaging a ratchet lock pawl (188) with a ratchet (182) to hold the support column in a lengthened configuration; and disengaging the ratchet lock pawl for the shortening of the support column.

For example, the method can comprise: forming a longitudinal slot (136) in the outer tubular member; projecting a cable connector plate (134) on the internal lift member radially outwardly into the longitudinal slot and connecting the cable to the cable connector; mounting a pulley (190) in a pulley support (192) positioned on the outer tubular member above the lift assembly; and passing the cable from the winch over the pulley to the cable connector. The winding of the cable up in the winch raises the internal lift member with respect to the outer tubular member; whereas playing the cable out of the winch lowers the internal lift member with respect to the outer tubular member.

The method preferably comprises sealingly engaging a deck lower surface (D1) with a resilient member (208) at an upper peripheral flange (206) of the receptacle.

The method preferably comprises engaging a horizontal bearing surface (B1) with the landing foot wherein the landing foot comprises a plate (124) extending laterally from the support column. Preferably, keeper bolts (156) are placed in respective first keepers (154) for the plurality of leg brackets to hold one or more of the stabilizing legs in the extended position with the free ends engaging the horizontal bearing surface. For removal and transport, the keeper bolts are placed in respective second keepers (152) for the plurality of leg brackets to hold one or more of the stabilizing legs in the retracted position with the free ends adjacent the support column.

When the apparatus is used adjacent to a wall(s), the keeper bolts are placed in one or more intermediate keepers (154A, 154B) for the plurality of leg brackets to hold the respective one or more stabilizing legs in the extended position with the free ends engaging an upright bearing surface (W1, W2) rising from the horizontal bearing surface.

In any embodiment the method further comprises one or more of: constructing the support column, the leg brackets, and the stabilizing legs from aluminum materials to reduce a weight of the apparatus; attaching an internal lift member of the support column to the receptacle and an outer tubular member of the support column to the landing foot; with a manual crank (178), selectively raising and lowering an internal lift member (132) with respect to an outer tubular member (126) slidably receiving the internal lift member to lengthen the support column to raise the receptacle and to shorten the support column to lower the receptacle; receiving a resilient member (208) on an outwardly extending flange (206) at an upper end (207) of the receptacle to sealingly engage a deck underneath surface (D1); attaching a transverse plate (198) to the upper end of the support column with gussets (202) and clips (204) to removably secure the receptacle to the transverse plate; and/or forming a longitudinal slot (136) in an outer tubular member (126) of the support column, wherein the outer tubular member slidably receives an internal lift member (132), securing one or more reinforcing rings (176, 196) to the outer tubular member along the longitudinal slot, positioning a pulley support (192) on the outer tubular member over the longitudinal slot and securing a pulley (190) in the pulley support, and attaching a winch (170) to a mounting (172) spanning the longitudinal slot and attached to the outer tubular member on either side of the longitudinal slot.

In another aspect of the invention, embodiments herein provide an apparatus (100) for mechanically raising and lowering a debris receptacle (104) mounted on an upper end (116) of an extensible support column (110). The support column has a landing foot (112) at a lower end (114) and an internal lift member (132) slidably received in an outer tubular member (126). A lift assembly (122) can selectively raise and lower the internal lift member with respect to the outer tubular member to lengthen the support column to raise the receptacle and to shorten the support column to lower the receptacle. The lift assembly comprises a winch (170) to wind up or play out a cable (138) connected to the internal lift member, a mounting (172) on the outer tubular member intermediate the landing foot and an upper end of the outer tubular member to attach the winch, a ratchet (182) and a ratchet lock pawl (188) for engagement to hold the support column in a lengthened configuration (119) and for disengagement for the shortening of the support column. A longitudinal slot (136) is formed in the outer tubular member and a cable connector plate (134) on the internal lift member projecting radially outwardly into the longitudinal slot and connected to the cable. A pulley (190) is mounted in a pulley support (192) positioned adjacent the longitudinal slot on the outer tubular member above the lift assembly. The cable passes from the winch over the pulley to the cable connector such that winding the cable up in the winch raises the internal lift member with respect to the outer tubular member to raise the receptacle, and playing the cable out of the winch lowers the internal lift member with respect to the outer tubular member to lower the receptacle.

With reference to the drawing figures in which like reference numerals indicate like parts and steps, it is noted that the drawing figures are simplified and may not show all of the parts that one of skill in the art would readily recognize.

FIG. 1 shows a side elevation of a core catcher apparatus 100 with legs 106 and column 110 in transport or deployment configurations 102, 103 with a debris receptacle 104 lowered and stabilizing legs 106 retracted according to an embodiment of the invention. Column 110 is upwardly extensible between a landing foot 112 at lower end 114 supported on the floor or other horizontal bearing surface B1 and receptacle 104 at upper end 116. The column 110 and the landing foot 112 are positioned at a core catching location L1 on the lower bearing surface B1 directly beneath a core drilling location indicated at the pilot hole H1 in an upper deck D elevated above the lower bearing surface B1. This can be done, for example, by drilling the pilot hole H1 through the deck D and illuminating the lower surface below the deck with a laser (not shown). Legs 106 are pivotally connected to leg brackets 130, preferably numbering four and positioned 90 degrees apart around the column 110. Lift assembly 122, which may be motorized or manual, is provided to extend and retract the column 110 between shortened configuration 103 and lengthened position 119 (see FIG. 3).

Figure 2:
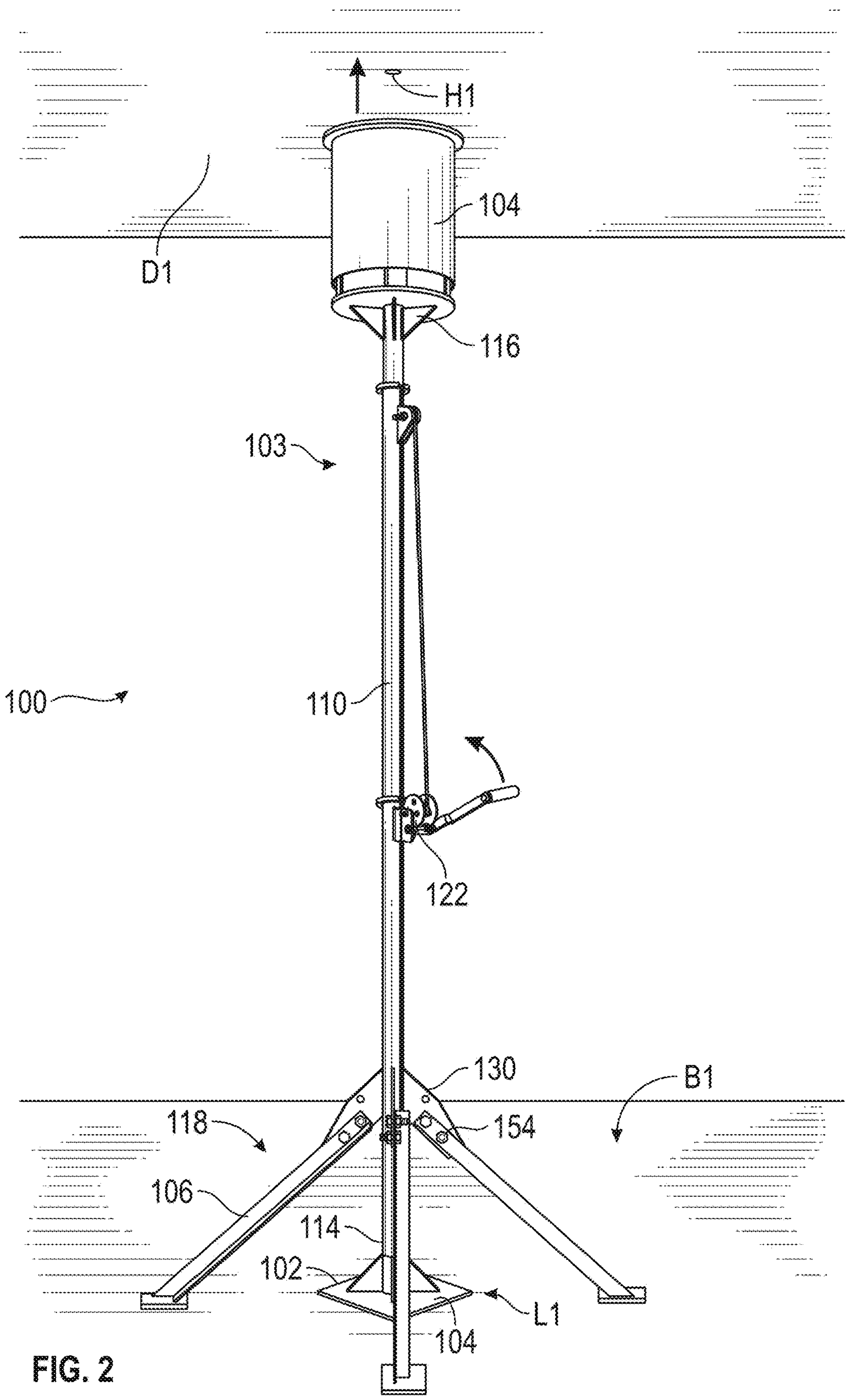
FIG. 2 shows a side elevation of the core catcher apparatus of FIG. 1 with the stabilizing legs deployed (118) and the lift assembly activated to elevate the debris receptacle.

FIG. 2 shows a side elevation of the core catcher apparatus of FIG. 1 with the stabilizing legs 106 in deployment configuration 118 and the lift assembly 122 activated to elevate the debris receptacle 104 toward the upper deck D.

Figure 3:
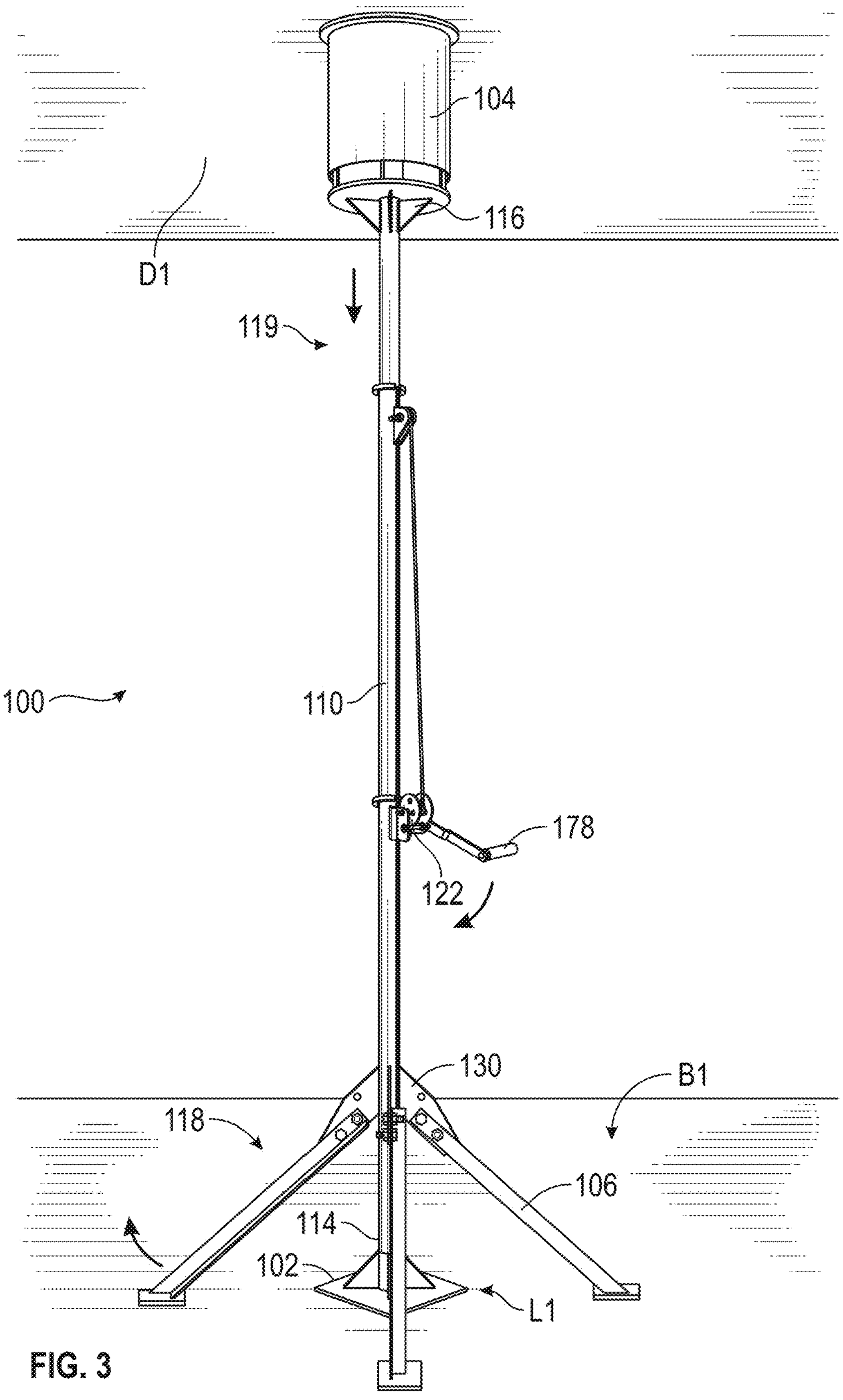
FIG. 3 shows the core catcher apparatus of FIG. 2 with the debris receptacle elevated (119) to engage the underdeck surface below the core drilling location.

FIG. 3 shows the core catcher 100 with the debris receptacle 104 elevated in position 119 to engage the underdeck surface D1 below the core drilling location at pilot hole H1. See also FIG. 16.

Figure 4:
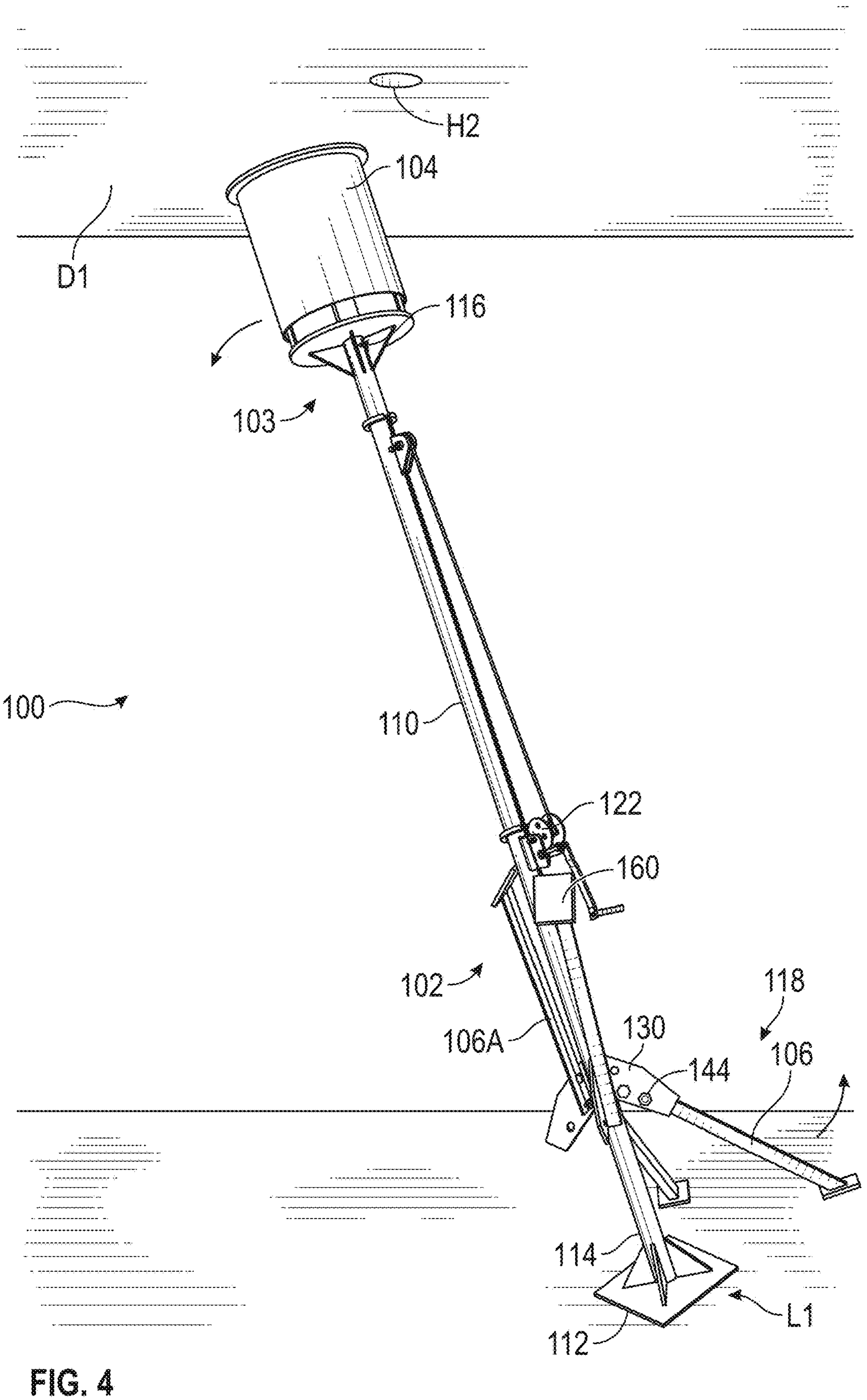
FIG. 4 shows the core catcher apparatus of FIG. 3 following the coring operation with the debris receptacle lowered (103) and stabilizing legs retracted (102) to facilitate tipping the apparatus.

FIG. 4 shows the core catcher 100 following the coring operation with the debris receptacle 104 in a lowered condition 103 and one or more stabilizing legs 106 retracted to facilitate tipping the apparatus in the direction of the retracted legs to retrieve the debris receptacle 104.

Figure 5:
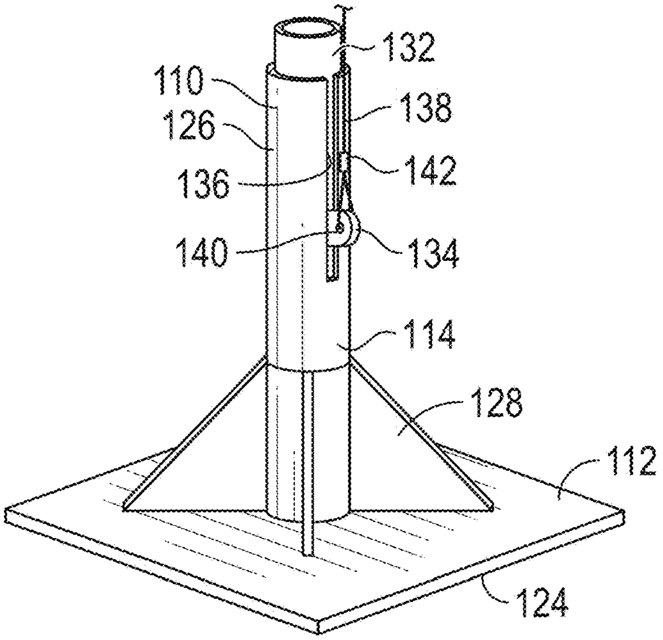
FIG. 5 is a side perspective view of the apparatus of FIGS. 1-4 partly cut away to show the details of a cable connection to the internal lift member, shown without the stabilizing legs/brackets for clarity.

FIG. 5 is a side perspective view of the apparatus of FIGS. 1-4 partly cut away to show the details of a cable 138 connection to the internal lift member 132, shown without the stabilizing legs/brackets (see FIG. 6) for clarity. The landing foot 112 can be made of a transverse plate 124 welded to an outer tubular member 126 of the column 110 and the connection reinforced with foot gussets 128, e.g., coincident with a plane of a respective leg bracket 130 (see FIG. 6). The plate is desirably sufficiently large that column 110 can rest in an upright position without additional support while the legs 106 are deployed. FIG. 5 also shows the internal lift member 132 slidably received in the outer tubular member 126. A connector plate 134 on a lower end of the internal lift member 132 projects into a longitudinal slot 136 formed in the outer tubular member 126. The connector plate 134 slides in the slot 136 as the internal lift member 132 slides in the outer tubular member 126. An end of cable 138 passes through a hole 140 formed in the connector plate 134 and positioned radially outwardly from the outer tubular member 126 and is secured with cable clamp 142.

Figure 6:
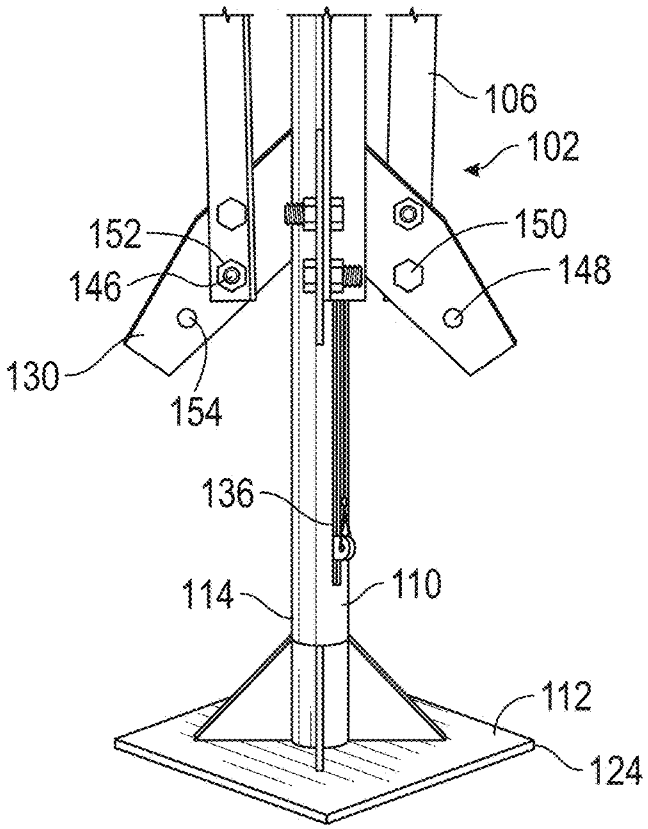
FIG. 6 is a side perspective view of the lower end of the apparatus of FIGS. 1-5 partly cut away and showing the leg bracket details with the stabilizing legs retracted in a storage/transportation configuration (102).
Figure 7:
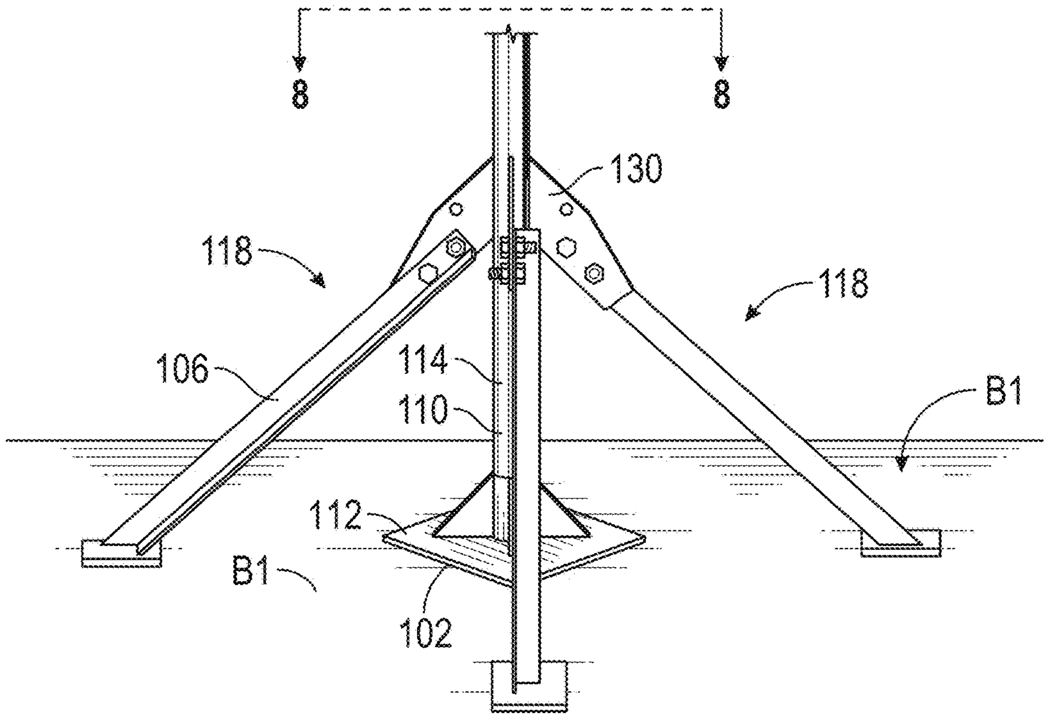
FIG. 7 is a side perspective view of the lower end of the apparatus of FIGS. 1-6 partly cut away and showing the legs extended in a deployed configuration (118) for stabilizing the apparatus on the floor.
Figure 8:
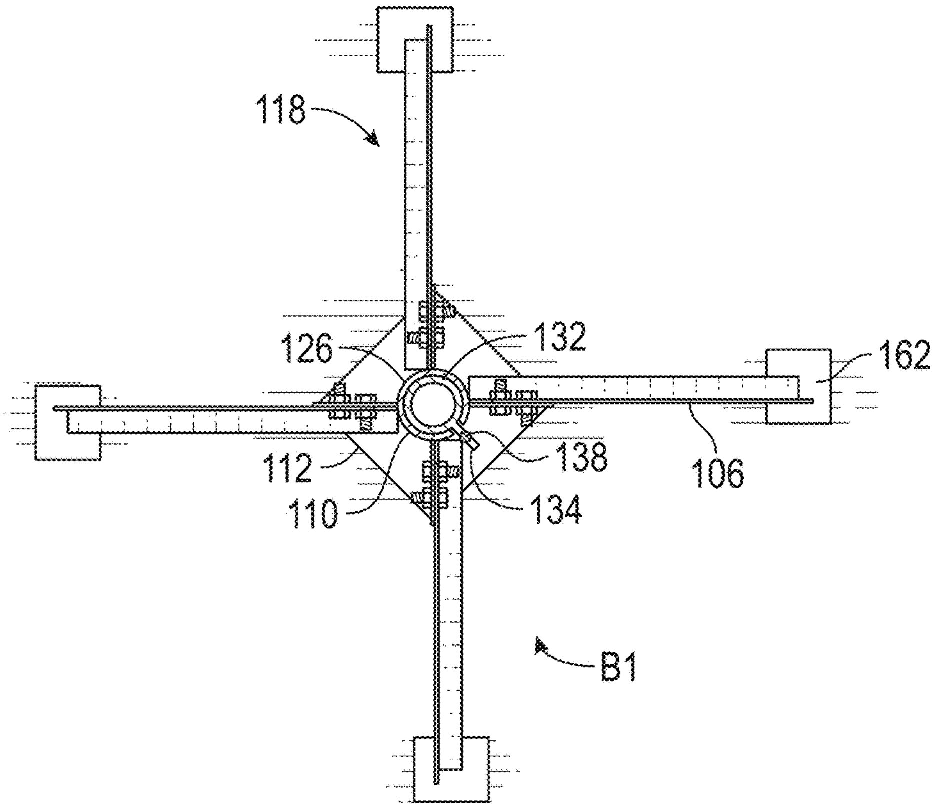
FIG. 8 is a plan view of the core catcher apparatus of FIG. 7 as seen along the view lines 8-8.

FIG. 6 is a side perspective view of the lower end of the apparatus 100 partly cut away and showing the leg bracket 130 details with the stabilizing legs 106 retracted in a storage/transportation configuration 102. FIG. 7 is a side perspective view of the lower end 114 of the apparatus 100 partly cut away and showing the legs 106 extended in a deployed configuration 118 for stabilizing the apparatus on the floor or other bearing surface B1, shown without the internal lift member 132 for clarity. FIG. 8 is a plan view of the core catcher apparatus of FIG. 7 as seen along the view lines 8-8. The brackets 130 are arranged as plates welded to the outer tubular member 126 and co-planar with the foot gussets 128 (FIG. 5). The pivot ends 144 of the legs 106 have pivot holes 146 connected to bracket pivot holes 148 using a pivot bolt 150. The brackets 130 may be provided with first keepers 154 and second keepers 152, both in the form of holes or bores, which receive keeper bolts 156 cooperating with keepers 158 in the legs 106, also in the form of a hole or bore, to hold the legs 106 in the retracted position 102 (FIG. 6) and extended position 118 (FIG. 7), respectively.

In FIG. 6, legs 106 are in retracted position 102 with free ends 160 held near the support column 110. This configuration is preferred for storage, transport, and deployment. In FIGS. 7-8, the free ends 160 are extended away from support column 110 and pads 162 attached to the free ends are co-planar with the landing foot 112 to engage the horizontal bearing surface B1 and stabilize the support column in an upright or generally vertical orientation.

Figure 10:
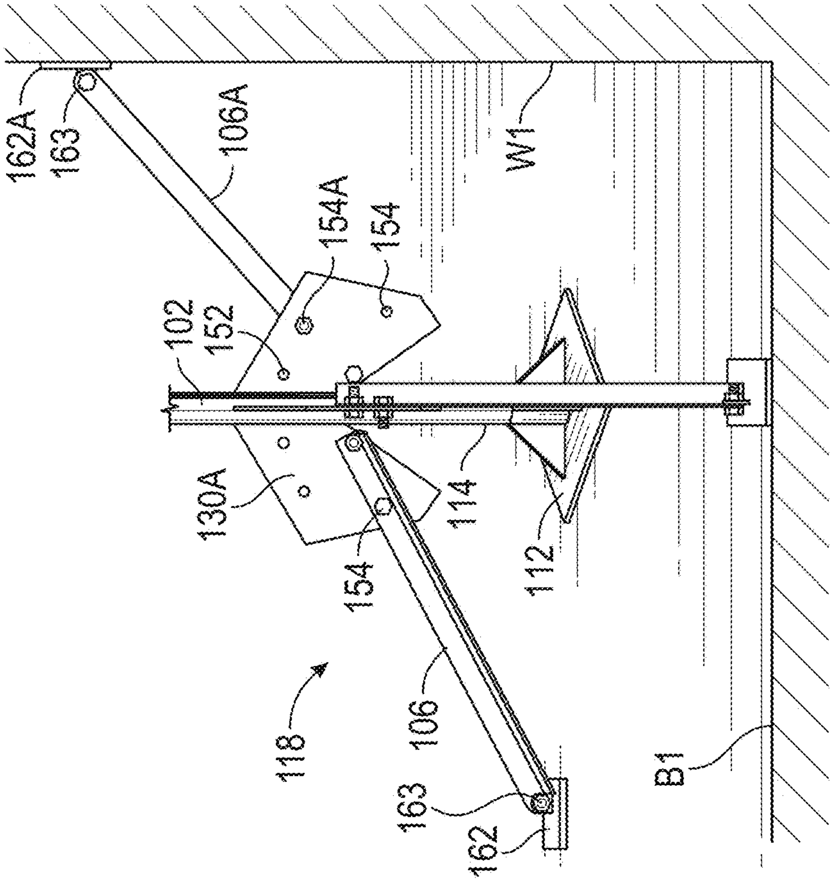
FIG. 10 is a side elevation of the core catcher apparatus of FIG. 9 as seen along the view lines 10-10.
Figure 9:
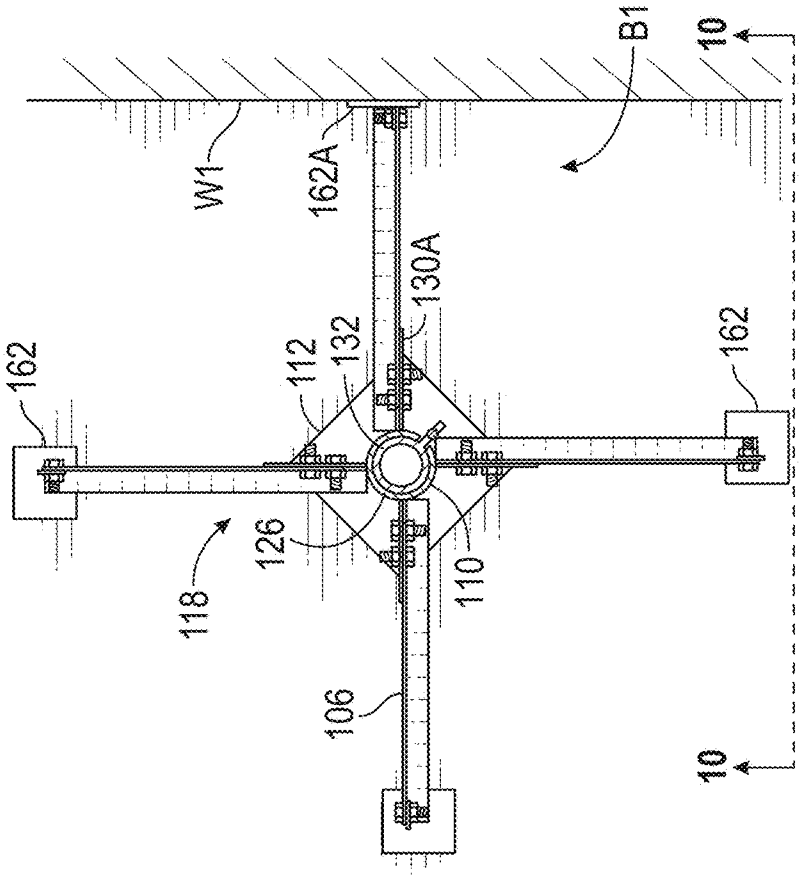
FIG. 9 is a plan view of an embodiment of the core catcher apparatus adapted for positioning adjacent to a wall and showing the legs extended in a deployed configuration (118) for stabilizing the apparatus on the floor and against the wall.

FIG. 9 is a plan view of an embodiment of the core catcher apparatus 100 adapted for positioning adjacent to a wall W1 and showing the legs 106 extended in deployed configuration 118 for stabilizing the apparatus on the floor B1 and against the wall. FIG. 10 is a side elevation as seen along the view lines 10-10. In this arrangement, leg 106A is extended to engage wall W1, e.g., with pad 162A, while the other legs 106 parallel to and away from the wall W1 are deployed with the pads 162 engaging the floor B1 as in FIGS. 7-8.

Figure 11:
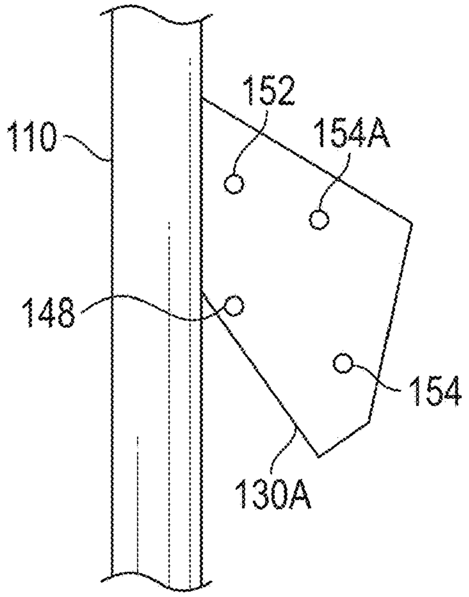
FIG. 11 shows a detail view of an alternative leg bracket embodiment with an intermediate keeper hole that can be used in the embodiments illustrated in FIGS. 9-10 and 13.
Figure 13:
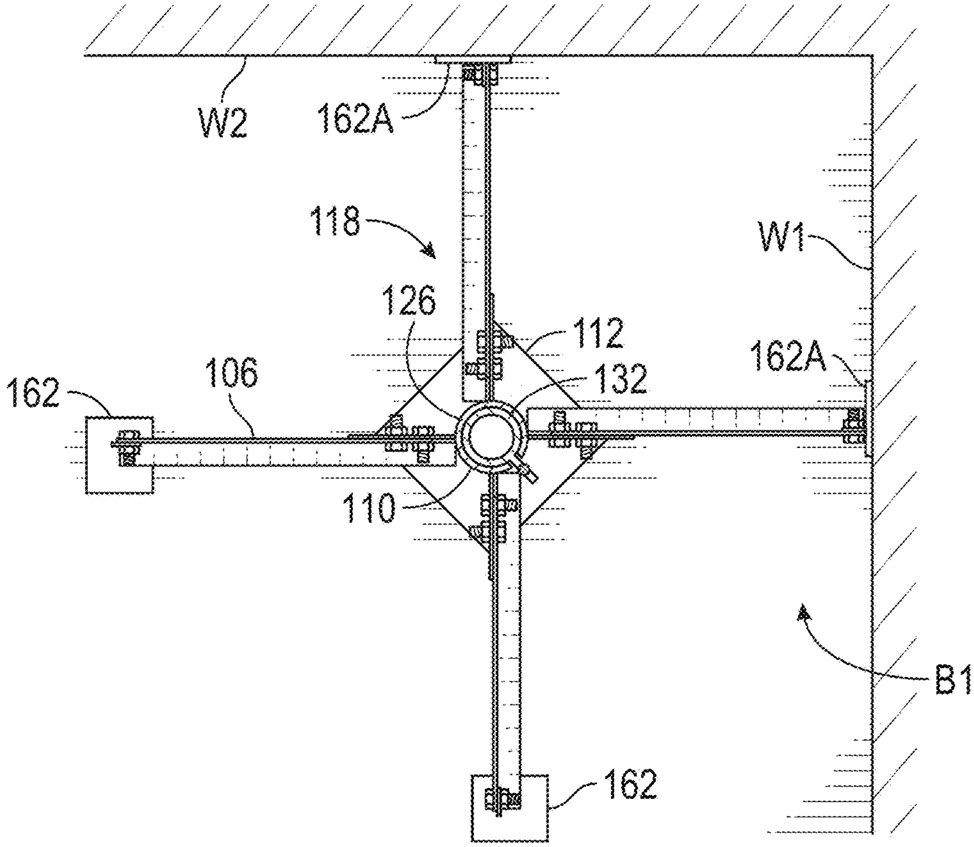
FIG. 13 is a plan view of an embodiment of the core catcher apparatus adapted for positioning adjacent to two walls that meet in a corner and showing the legs extended in a deployed configuration (118) for stabilizing the apparatus on the floor and against the walls.

FIG. 11 shows a detail view of an alternative leg bracket 130A with an intermediate keeper hole 154A that can be used in the embodiments illustrated in FIGS. 9-10 and 13. For this configuration, the brackets 130A are preferably provided with intermediate keepers 154A as shown in FIG. 11 to hold the legs 106A in a corresponding extended position 118 against the vertical bearing surface W1.

Figure 12:
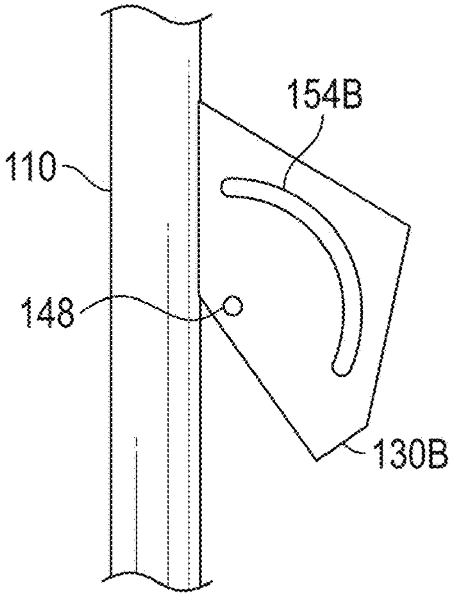
FIG. 12 shows a detail view of another alternative leg bracket embodiment with a radius arc keeper hole that is also suitable for use in the embodiments illustrated in FIGS. 9-10 and 13 where the core catcher apparatus can be stabilized against a wall(s) where the distance from the stabilizing wall(s) can be adjusted and the wall-stabilizing legs firmly secured.

FIG. 12 shows a detail view of another alternative leg bracket 130B with a radius arc keeper hole 154B that is also suitable for use in the embodiments illustrated in FIGS. 9-10 and 13 where the core catcher apparatus can be stabilized against a wall(s) W1, W2 where the distance from the stabilizing wall(s) can be adjusted and the wall-stabilizing legs 106A firmly secured against the respective wall. In these embodiments, the pads 162, 162A may be pivotally attached via pad pivot bolt 163 to the free ends of the legs 106.

FIG. 13 is a plan view of an embodiment of the core catcher apparatus adapted for positioning adjacent to two walls W1, W2, e.g., that meet in a corner, and showing the legs 106, 106A extended in a deployed configuration 118 for stabilizing the apparatus on the floor B1 and against the walls W1, W2. In this embodiment, the pads 162A, 162A' opposite the walls W1, W2 are extended and optionally pivoted to engage the walls flat while the other legs 106 are deployed parallel to the walls W1, W2 with the pads 162 engaging the floor B1 as in FIGS. 7-8.

Figure 14:
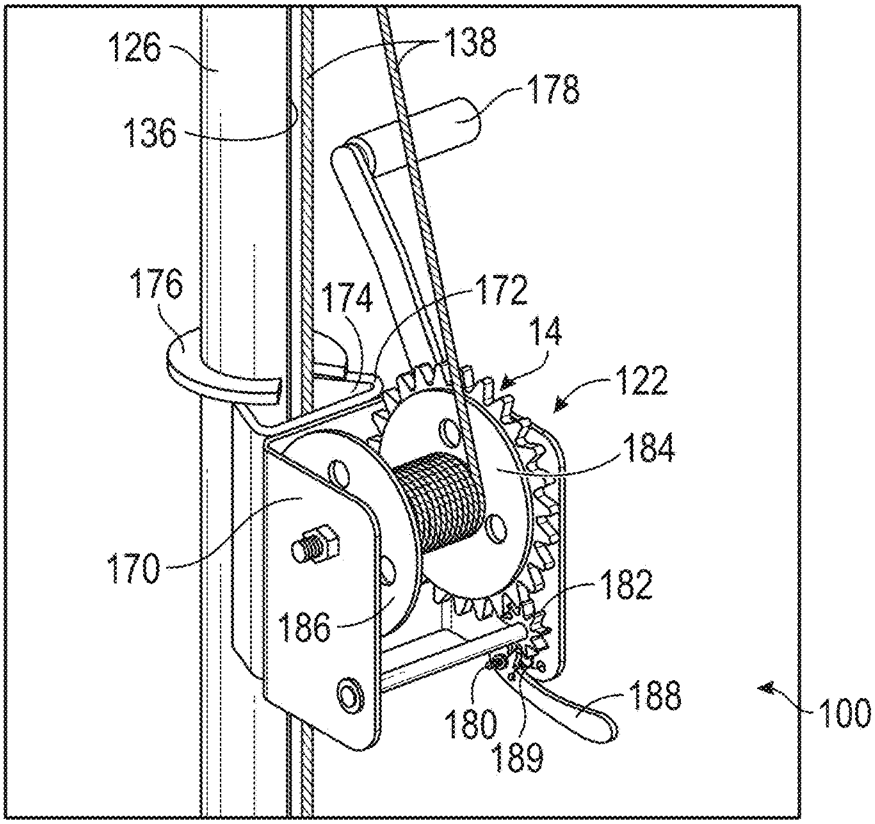
FIG. 14 is a side perspective view of a lift assembly section embodiment suitable for use in the core catcher apparatus of FIGS. 1-13.

FIG. 14 is a side perspective view of an embodiment of a preferred lift assembly 122 section suitable for use in the core catcher apparatus 100. The lift assembly 122 comprises a winch 170 with a hand crank 178 (but could easily be motorized) secured to a mounting 172 attached to the outer tubular member 126 at an intermediate location. Conveniently, the mounting 172 can span the longitudinal slot 136 with mounting legs 174 on either side thereof. Additionally, a slotted reinforcing ring 176 may be provided on the outer tubular member 126 adjacent to mounting 172.

The hand winch 170 may have a manual handle or crank 178 that turns an axle 180 supporting a ratchet gear 182 meshed with drive gear 184 on spool 186 to take up or play out cable 138. Ratchet pawl lock 188 can be biased by spring 189 to engage ratchet gear 182 to hold the spool 186 with the cable 138 taken up in the extended or lengthened position 119 (see FIGS. 3 and 17) of column 110 so that column 110 does not retract or shorten during the coring operation. Either the pawl 188 or gear 182 can be profiled for ratcheting as the cable 138 is taken up and column 110 is extended or lengthened to configuration 119. Column 110 can be configured into the retracted or shortened position 103 (see FIGS. 1, 2, 4) by disengaging the ratchet pawl lock 188 from the ratchet gear 182 and unwinding and playing out the cable 138 from the spool 186.

Figure 15:
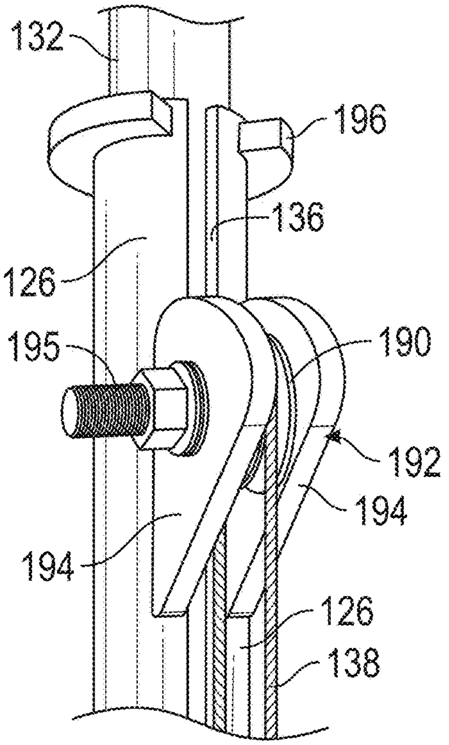
FIG. 15 is a side perspective view of a pulley section embodiment suitable for use in the core catcher apparatus of FIGS. 1-14.

FIG. 15 is a side perspective view of a pulley section embodiment showing a pulley 190 aligned with slot 136 mounted in a pulley support 192 attached to the outer tubular member 126 above the lift assembly 122, e.g., at an upper end of the outer tubular member 126. Pulley support 192 comprises support members 194 located on either side of slot 136 and a pulley axle 195 provided as an end threaded bolt-and-nut member received in bores through the pulley supports. Additionally, an upper slotted reinforcing ring 196 may be provided on the outer tubular member 126 adjacent to the pulley support 192.

Cable 138 passes from winch 170 (FIG. 14) over pulley 190 (FIG. 15) to the connector plate 134 (FIG. 5). Thus, winding the cable 138 up in the winch 170 raises the internal lift member 132 with respect to the outer tubular member 126 to extend the column 110 and elevate the debris receptacle 104, whereas playing the cable 138 out of the winch 170 lowers the internal lift member 132 with respect to the outer tubular member 126 to retract the column 110 and lower the debris receptacle 104.

Figure 16:
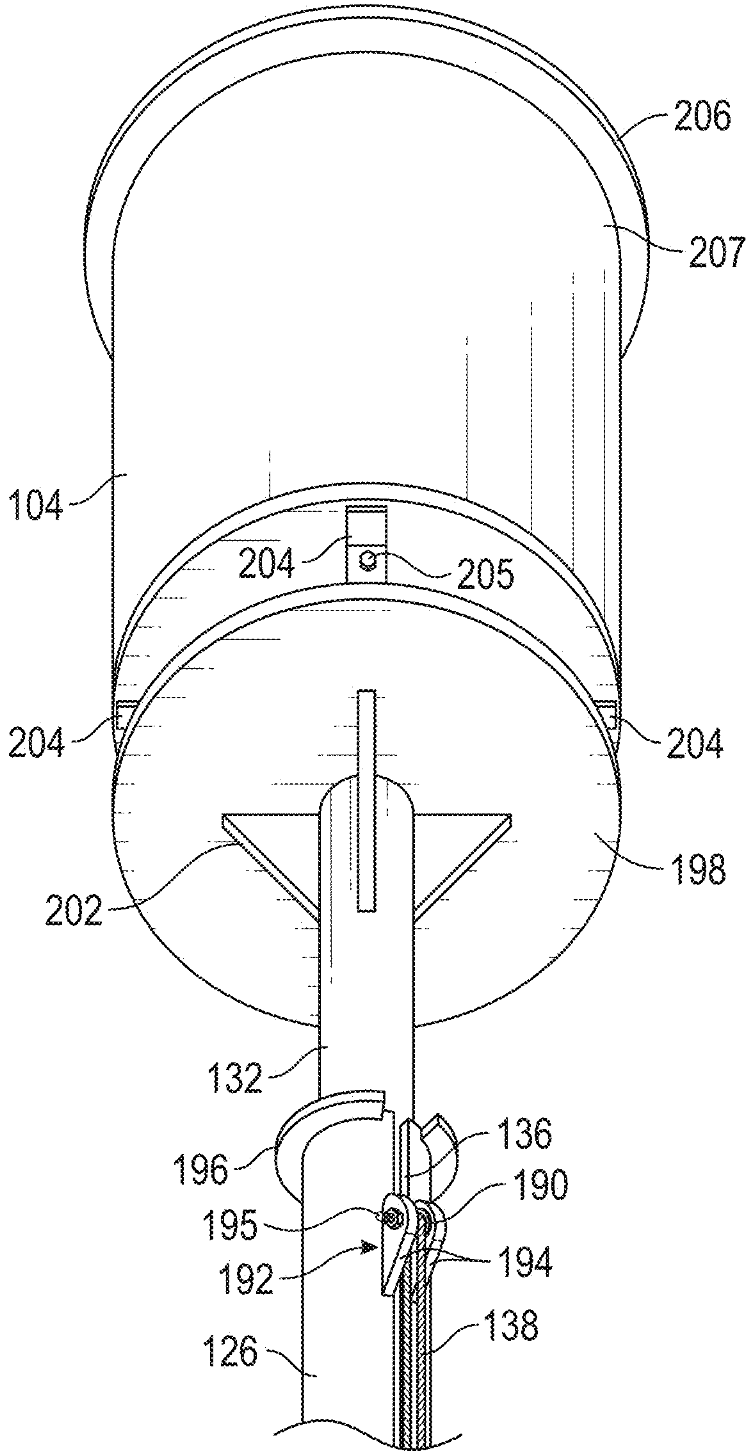
FIG. 16 is a side perspective view from below of a pulley section and a debris receptacle embodiment suitable for use in the core catcher apparatus of FIGS. 1-15.
Figure 17:
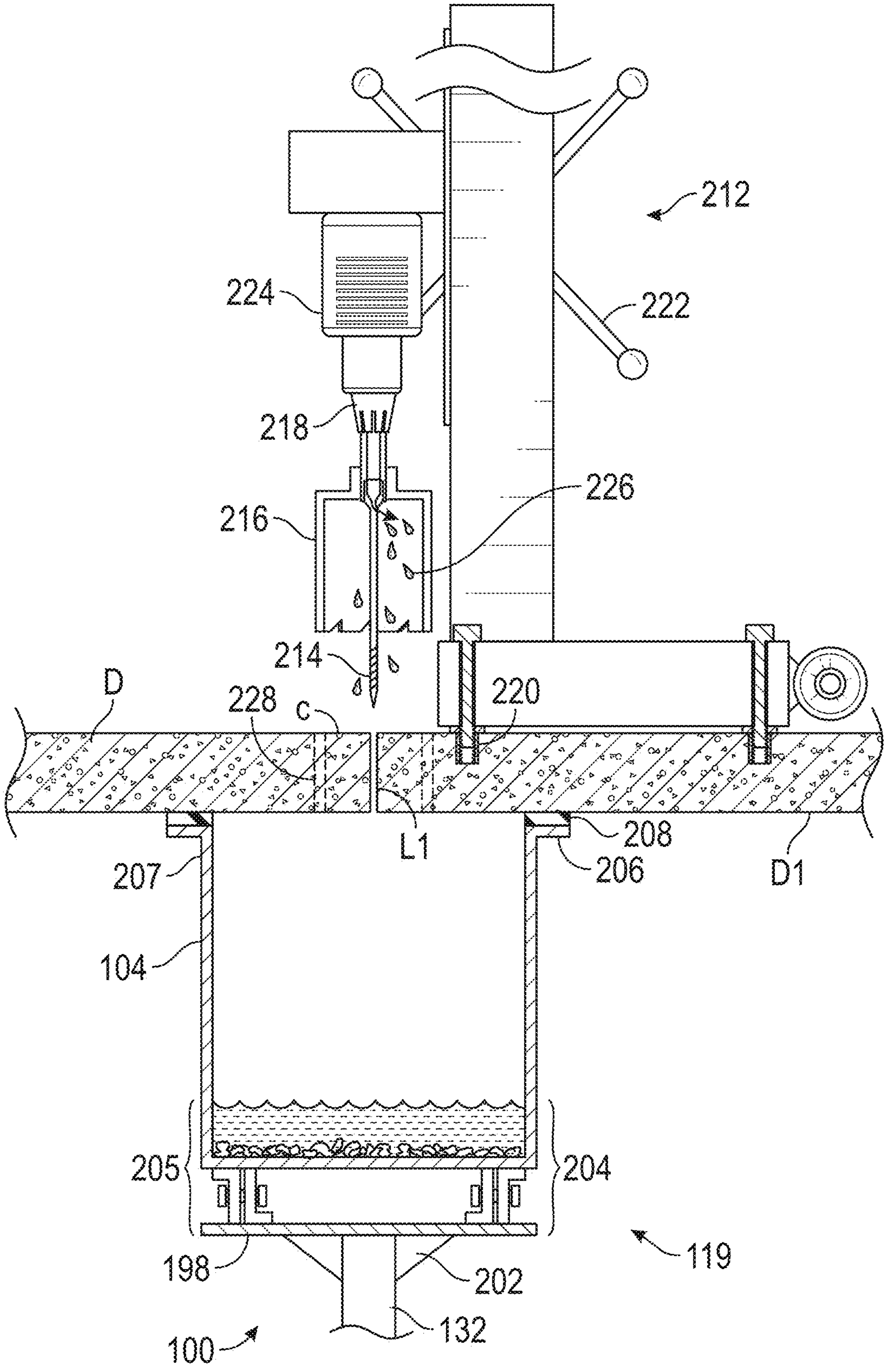
FIG. 17 is a side sectional view of an upper end of the core catcher apparatus of FIGS. 1-15 positioned underneath a coring operation to catch the core and debris.

FIG. 16 shows a perspective of a debris receptacle 104 at an upper end 116 of the internal lift member 132 of the support column 110 and FIG. 17 shows the receptacle 104 positioned underneath a coring operation to catch the core C and debris G.

A top plate 198 can be welded to the upper end of the internal lift member 132 and reinforced with upper plate gussets 202. The top plate 198 preferably has a lateral profile matching that of the receptacle 104, e.g., circular. Receptacle 104 is preferably removably secured to the top plate 198 by a plurality of radially spaced clips 204, which may include threaded bolts 205. The receptacle 104 can be stored and transported separately from the support column 110 if desired, and may be attached using the clips 204 before the support column 110 is deployed and/or extended. Similarly, the receptacle 204 can, if desired, be removed following the coring operation for core C transport, recovery and/or cleaning the receptacle 104.

FIG. 17 is a side sectional view of the debris receptacle 104 positioned atop the lengthened support column 110 underneath a coring operation using a conventional concrete coring machine 212 to drill a core C from the elevated upper deck D to catch the core C and associated debris and/or drilling fluid. Preferably, receptacle 104 is provided with an outwardly extending flange 206 at an upper end 207 to support a resilient member 208 for sealingly engaging the underdeck surface D and keep any debris or drilling fluid from escaping.

Preliminarily, the location of the cut may be marked on the upper deck D and a pilot hole H1 drilled with a hammer drill, for example. Once the core catcher 100 has been positioned under the pilot hole H1 (FIG. 1) and the debris receptacle 104 elevated to engage the lower surface D1 of the upper deck D (FIG. 3), the coring machine 212 can be positioned over the pilot hole H1. Then, the guide bit 214 is aligned with the pilot hole H1, guide bit 214 and core bit 216 attached to a chuck 218, and the coring machine 212 can be anchored in position at anchors 220.

A lever arm 222 can be rotated by an operator to move a motor 224 and the core bit 216 to engage the upper deck D. At the same time, a drilling lubrication fluid 226 may be introduced, which can flow through the pilot hole H1 and, after separation of the core C, through the circular hole H2 left in the deck D. Further advancement of the core bit 216 through the deck D removes material from an annulus 228 around the core C and severs the core C, which falls into the debris receptacle 104, leaving the hole H2 formed in the deck D.

The core catcher 100 can then be removed as discussed above in connection with FIG. 4, i.e., by shortening the column 110, e.g., by playing out the cable 138 from the spool 186, lowering the debris receptacle 104, retracting the legs 106, tipping the apparatus 100, removing the debris receptacle 104 via clips 204 (FIGS. 16-17), if desired, and recovering the core C, any debris, and drilling fluid. The receptacle 104 can then be cleaned as desired and the apparatus 100 relocated to the next coring location.

All documents described herein are incorporated by reference herein, including any priority documents and/or testing procedures to the extent they are not inconsistent with this text. As is apparent from the foregoing general description and the specific embodiments, while forms of this disclosure have been illustrated and described, various modifications can be made without departing from the spirit and scope of this disclosure. Accordingly, it is not intended that this disclosure be limited thereby. Likewise, the term "comprising" is considered synonymous with the term "including" for purposes of United States law. Likewise, whenever a composition, an element or a group of elements is preceded with the transitional phrase "comprising," it is understood that we also contemplate the same composition or group of elements with transitional phrases "consisting essentially of," "consisting of," "selected from the group of consisting of," or "is" preceding the recitation of the composition, element, or elements and vice versa.

While this disclosure has been described with respect to a number of embodiments and examples, those skilled in the art, having benefit of this disclosure, will appreciate that other embodiments can be devised which do not depart from the scope and spirit of this disclosure.

What is claimed is:

1. A core catcher apparatus (100), comprising:

a support column (110) that is retractably extensible between a landing foot (112) connected at a lower end (114) of the support column and a receptacle (104) mounted at an upper end (116) of the support column;

a plurality of leg brackets (130) radially positioned about the support column near the lower end and spaced above the landing foot; and a like plurality of respective stabilizing legs (106) having connected ends (144) pivotally connected to the leg brackets and free ends (160) independently pivotable between a retracted position (102) with the free ends adjacent the support column and an extended position (118) with the free ends spaced away from the support column to engage a stabilizing surface (B1, B2).

2. The core catcher apparatus of claim 1 wherein the support column comprises:

an internal lift member (132) supporting the receptacle at the upper end and slidably received in an outer tubular member (126) connected to the landing foot at the lower end; and a lift assembly (122) to selectively raise and lower the internal lift member with respect to the outer tubular member to lengthen the support column to raise the receptacle and to shorten the support column to lower the receptacle.

3. The core catcher apparatus of claim 2 wherein the lift assembly comprises:

a winch (170) to wind up or play out a cable (138) connected to the internal lift member;

a mounting (172) on the outer tubular member to attach the winch;

a ratchet (182); and a ratchet lock pawl (188) for engagement to hold the support column in a lengthened configuration and for disengagement for the shortening of the support column.

4. The core catcher apparatus of claim 3 further comprising:

a longitudinal slot (136) formed in the outer tubular member;

a cable connector plate (134) on the internal lift member projecting radially outwardly into the longitudinal slot and connected to the cable;

a pulley (190) mounted in a pulley support (192) positioned on the outer tubular member above the lift assembly; and wherein the cable passes from the winch over the pulley to the cable connector, wherein winding the cable up in the winch raises the internal lift member with respect to the outer tubular member, and wherein playing the cable out of the winch lowers the internal lift member with respect to the outer tubular member.

5. The core catcher apparatus of claim 1 wherein the receptacle comprises a resilient member (208) at an upper peripheral flange (206) to sealingly engage a deck lower surface (D1).

6. The core catcher apparatus of claim 1 wherein the landing foot comprises a transverse plate extending laterally from the support column to engage a horizontal bearing surface (B1.

7. The core catcher apparatus of claim 6 further comprising respective first keepers (154) for the plurality of stabilizing legs to cooperate with a keeper bolt (156) and hold the stabilizing legs in the extended position with the free ends engaging the horizontal bearing surface.

8. The core catcher apparatus of claim 7 further comprising respective second keepers for the plurality of stabilizing legs to cooperate with the keeper bolt and hold the stabilizing legs in the retracted position with the free ends adjacent the support column.

9. The core catcher apparatus of claim 7 further comprising one or more intermediate keepers or a radius arc keeper for the plurality of stabilizing legs to cooperate with the keeper bolts and hold the stabilizing legs in the extended position with the free ends engaging an upright bearing surface (W1) rising from the horizontal bearing surface.

10. The core catcher apparatus of claim 1 further comprising one or more of:

aluminum materials of construction for the support column, the leg brackets, and the stabilizing legs to reduce a weight of the apparatus;

a lift assembly (122) comprising a manual crank (178) to selectively raise and lower an internal lift member (132) with respect to an outer tubular member (126) slidably receiving the internal lift member to lengthen the support column to raise the receptacle and to shorten the support column to lower the receptacle;

an outwardly extending flange (206) at an upper end (207) of the receptacle to receive a resilient member (208) to sealingly engage a deck lower surface;

a transverse plate (198) attached to the upper end of the support column with upper plate gussets (202) and clips (204) to removably secure the receptacle to the transverse plate;

a longitudinal slot (136) formed in an outer tubular member (126) of the support column, wherein the outer tubular member slidably receives an internal lift member (132), one or more slotted reinforcing rings (176, 196) secured to the outer tubular member along the longitudinal slot, a pair of pulley support members (194) positioned on the outer tubular member on either side of the longitudinal slot and securing a pulley (190), and a mounting (172) to attach a winch wherein the mounting spans the longitudinal slot and is attached to the outer tubular member on either side of the longitudinal slot.

11. A method of catching a core drilled from an elevated deck, comprising:

determining a core drilling location (H1) in an upper deck (D) elevated above a lower bearing surface (B1);

determining a core catching location (L1) on the lower bearing surface beneath the core drilling location;

positioning on the lower bearing surface at the core catching location a landing foot (112) of a core catching apparatus (100), wherein the landing foot is connected to a lower end of a support column (110) for a receptacle (104) mounted at an upper end (116) of the support column;

independently pivoting a plurality of stabilizing legs, having connected ends (144) pivotally connected to a like plurality of leg brackets (130) radially positioned about the support column near the lower end and spaced above the landing foot, to engage respective free ends of the stabilizing legs with one or more stabilizing surfaces (B1, B2) in an extended position (118) to stabilize the core catching apparatus;

extending a length of the support column to raise the receptacle to engage an underneath surface (D1) of the upper deck about the core drilling location;

with the receptacle in engagement with the underneath surface, coring the upper deck at the core drilling location and catching a core (C) in the receptacle;

retracting the length of the support column to lower the receptacle;

removing the core from the lowered receptacle; and independently pivoting the plurality of stabilizing legs to position the respective free ends adjacent the support column in a retracted position (102).

12. The method of catching the core drilled from the elevated deck of claim 11 further comprising operating a lift assembly (122) to selectively raise and lower an internal lift member (132) of the support column with respect to an outer tubular member (126) slidably receiving the internal lift member to lengthen the support column to raise the receptacle and to shorten the support column to lower the receptacle.

13. The method of catching the core drilled from the elevated deck of claim 12 wherein the operation of the lift assembly comprises:

winding up in, or playing out from, a winch (170), a cable (138) connected to the internal lift member, wherein the winch is attached on a mounting (172) to the outer tubular member;

engaging a ratchet lock pawl (188) with a ratchet (182) to hold the support column in a lengthened configuration; and disengaging the ratchet lock pawl for the shortening of the support column.

14. The method of catching the core drilled from the elevated deck of claim 13 comprising:

forming a longitudinal slot (136) in the outer tubular member;

projecting a cable connector plate (134) on the internal lift member radially outwardly into the longitudinal slot and connecting the cable to the cable connector;

mounting a pulley (190) in a pulley support (192) positioned on the outer tubular member above the lift assembly;

passing the cable from the winch over the pulley to the cable connector;

wherein the winding of the cable up in the winch raises the internal lift member with respect to the outer tubular member; and wherein playing the cable out of the winch lowers the internal lift member with respect to the outer tubular member.

15. The method of catching the core drilled from the elevated deck of claim 11 comprising sealingly engaging a deck lower surface (D1) with a resilient member (208) at an upper peripheral flange (206) of the receptacle.

16. The method of catching the core drilled from the elevated deck of claim 11 comprising engaging a horizontal bearing surface (B1) with the landing foot wherein the landing foot comprises a plate (124) extending laterally from the support column.

17. The method of catching the core drilled from the elevated deck of claim 16 comprising placing keeper bolts (156) in respective first keepers (154) for the plurality of leg brackets to hold one or more of the stabilizing legs in the extended position with the free ends engaging the horizontal bearing surface.

18. The method of catching the core drilled from the elevated deck of claim 17 comprising placing the keeper bolts in respective second keepers (152) for the plurality of leg brackets to hold one or more of the stabilizing legs in the retracted position with the free ends adjacent the support column.

19. The method of catching the core drilled from the elevated deck of claim 17 comprising placing the keeper bolt(s) in one or more intermediate keepers (154A, 154B) for the plurality of leg brackets to hold the respective one or more stabilizing legs in the extended position with the free ends engaging an upright bearing surface (W1, W2) rising from the horizontal bearing surface.

20. A core catcher apparatus (100), comprising:

a support column (110) having a landing foot (112) at a lower end (114) and a receptacle (104) mounted at an upper end (116), the support column comprising an internal lift member (132) slidably received in an outer tubular member (126);

a lift assembly (122) to selectively raise and lower the internal lift member with respect to the outer tubular member to lengthen the support column to raise the receptacle and to shorten the support column to lower the receptacle, the lift assembly comprising a winch (170) to wind up or play out a cable (138) connected to the internal lift member, a mounting (172) on the outer tubular member intermediate the landing foot and an upper end of the outer tubular member to attach the winch, a ratchet (182) and a ratchet lock pawl (188) for engagement to hold the support column in a lengthened configuration (119) and for disengagement for the shortening of the support column;

a longitudinal slot (136) formed in the outer tubular member;

a cable connector plate (134) on the internal lift member projecting radially outwardly into the longitudinal slot and connected to the cable; and a pulley (190) mounted in a pulley support (192) positioned adjacent the longitudinal slot on the outer tubular member above the lift assembly, the cable passing from the winch over the pulley to the cable connector, wherein winding the cable up in the winch raises the internal lift member with respect to the outer tubular member to raise the receptacle, and playing the cable out of the winch lowers the internal lift member with respect to the outer tubular member to lower the receptacle.

* * * * *